(12) United States Patent
Jung et al.

(10) Patent No.: US 12,148,879 B2
(45) Date of Patent: Nov. 19, 2024

(54) METHOD OF MANUFACTURING POSITIVE ELECTRODE FOR ALL-SOLID-STATE BATTERIES AND POSITIVE ELECTRODE FOR ALL-SOLID-STATE BATTERIES MANUFACTURED USING THE SAME

(71) Applicant: LG Energy Solution, Ltd., Seoul (KR)

(72) Inventors: Hye Ri Jung, Daejeon (KR); Lak Young Choi, Daejeon (KR); Hyea Eun Han, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 444 days.

(21) Appl. No.: 17/437,620

(22) PCT Filed: Apr. 28, 2020

(86) PCT No.: PCT/KR2020/005573
§ 371 (c)(1),
(2) Date: Sep. 9, 2021

(87) PCT Pub. No.: WO2020/226322
PCT Pub. Date: Nov. 12, 2020

(65) Prior Publication Data
US 2022/0190381 A1    Jun. 16, 2022

(30) Foreign Application Priority Data

May 8, 2019   (KR) .................. 10-2019-0053693

(51) Int. Cl.
*H01M 10/0562*   (2010.01)
*H01M 4/04*       (2006.01)
(Continued)

(52) U.S. Cl.
CPC ..... *H01M 10/0562* (2013.01); *H01M 4/0404* (2013.01); *H01M 4/621* (2013.01);
(Continued)

(58) Field of Classification Search
CPC .......... H01M 10/0562; H01M 4/0404; H01M 4/621; H01M 4/625
(Continued)

(56) References Cited

U.S. PATENT DOCUMENTS

2008/0020283 A1    1/2008  Miyashiro et al.
2008/0311471 A1*  12/2008  Suzuki .................. H01M 4/621
                                                            429/231.95
(Continued)

FOREIGN PATENT DOCUMENTS

CN    105830260 A    8/2016
CN    107039655 A    8/2017
(Continued)

OTHER PUBLICATIONS

International Search Report for Application No. PCT/KR2020/005573 mailed Jul. 31, 2020, pp. 1-2.
(Continued)

*Primary Examiner* — James M Erwin
*Assistant Examiner* — John S Medley
(74) *Attorney, Agent, or Firm* — Lerner David LLP (57) ABSTRACT

A method of manufacturing a positive electrode for sulfide-based all-solid-state batteries, including: preparing a slurry, coating the slurry on a current collector, and then drying. The slurry is prepared by a method including the steps of a) mixing a positive electrode active material and a solid electrolyte in a dry state; b) adding a conducting agent to the mixture of step a) and mixing in a dry state; and c) adding a binder and a solvent to the mixture of step b) and mixing in a wet state.

11 Claims, 10 Drawing Sheets

(51) Int. Cl.
*H01M 4/62* (2006.01)
*H01M 4/02* (2006.01)

(52) U.S. Cl.
CPC ...... *H01M 4/625* (2013.01); *H01M 2004/028* (2013.01); *H01M 2300/0065* (2013.01)

(58) Field of Classification Search
USPC .......................................................... 429/212
See application file for complete search history.

(56) References Cited

U.S. PATENT DOCUMENTS

| | | | |
|---|---|---|---|
| 2009/0311604 A1* | 12/2009 | Nazar | H01M 4/581 |
| | | | 428/312.2 |
| 2015/0325844 A1 | 11/2015 | Inoue | |
| 2016/0190565 A1 | 6/2016 | Woo et al. | |
| 2016/0268627 A1* | 9/2016 | Lee | H01M 4/587 |
| 2016/0268638 A1 | 9/2016 | Jang et al. | |
| 2017/0069894 A1* | 3/2017 | Ishihara | H01M 10/0431 |
| 2017/0214051 A1 | 7/2017 | Yoon et al. | |
| 2017/0244097 A1* | 8/2017 | Ose | H01M 4/136 |
| 2017/0309890 A1* | 10/2017 | Shin | C01G 45/1228 |
| 2018/0076450 A1* | 3/2018 | Torita | H01M 10/0525 |
| 2018/0219229 A1 | 8/2018 | Miki | |
| 2019/0020016 A1* | 1/2019 | Ahn | H01M 4/139 |
| 2019/0140254 A1 | 5/2019 | Kim et al. | |
| 2019/0245203 A1 | 8/2019 | Cho et al. | |
| 2019/0260021 A1 | 8/2019 | Woo et al. | |
| 2019/0260065 A1* | 8/2019 | Yashiro | H01M 4/362 |
| 2019/0341616 A1 | 11/2019 | Yoon et al. | |
| 2021/0119246 A1 | 4/2021 | Kawase et al. | |
| 2022/0271296 A1 | 8/2022 | Miki | |

FOREIGN PATENT DOCUMENTS

| | | |
|---|---|---|
| CN | 108390021 A | 8/2018 |
| CN | 109155393 A | 1/2019 |
| CN | 109314228 A | 2/2019 |
| EP | 3451425 A2 | 3/2019 |
| JP | 2013222501 A | 10/2013 |
| JP | 2014143133 A | 8/2014 |
| JP | 2016207418 A | 12/2016 |
| JP | 2017135094 A | 8/2017 |
| JP | 2018120710 A | 8/2018 |
| KR | 20150062989 A | 6/2015 |
| KR | 20160044951 A | 4/2016 |
| KR | 20160078821 A | 7/2016 |
| KR | 20160083485 A | 7/2016 |
| KR | 20160109604 A | 9/2016 |
| KR | 101673724 B1 | 11/2016 |
| KR | 20170089333 A | 8/2017 |
| KR | 20180048309 A | 5/2018 |
| KR | 20180115130 A | 10/2018 |
| WO | 2006018921 A1 | 2/2006 |
| WO | 2018084449 A2 | 5/2018 |

OTHER PUBLICATIONS

Extended European Search Report including Written Opinion for Application No. 20802760.7 dated Mar. 24, 2022, pp. 1-10.

* cited by examiner

METHOD OF MANUFACTURING POSITIVE ELECTRODE FOR ALL-SOLID-STATE BATTERIES AND POSITIVE ELECTRODE FOR ALL-SOLID-STATE BATTERIES MANUFACTURED USING THE SAME

CROSS-REFERENCE TO RELATED APPLICATIONS

The present application is national stage entry under 35 U.S.C. § 371 of International Application No. PCT/KR2020/005573 filed on Apr. 28, 2020, which claims priority to Korean Patent Application No. 10-2019-0053693 filed on May 8, 2019, the disclosures of which are hereby incorporated by reference herein their entirety.

TECHNICAL FIELD

The present invention relates to a method of manufacturing a positive electrode for all-solid-state batteries and a positive electrode for all-solid-state batteries manufactured using the same. Particularly, it relates to a method of manufacturing a positive electrode for all-solid-state batteries, the method comprising a process of mixing a positive electrode active material and a solid electrolyte in a dry state, and then adding and mixing a conducting agent thereto; and a process of mixing in a wet state by adding a binder and a solvent to the mixed mixture, and a positive electrode for all-solid-state batteries manufactured using the same.

BACKGROUND ART

A lithium ion secondary battery has advantages in that the lithium ion secondary battery has higher energy density, a lower self-discharge rate, and a longer lifespan than a nickel manganese battery or a nickel cadmium battery; however, a safety-related problem due to overheating and a low-output problem are pointed out as disadvantages thereof.

In order to solve such problems of the lithium ion secondary battery, an all-solid-state battery is presented as an alternative. The all-solid-state battery may be configured to have a structure in which the all-solid-state battery comprises an electrolyte layer including a solid electrolyte, a positive electrode layer including a solid electrolyte, and a negative electrode layer including a solid electrolyte, wherein the positive electrode layer and the negative electrode layer are formed on opposite surfaces of the electrolyte layer, and in which a current collector is coupled to each electrode.

The all-solid-state battery may be divided into an oxide-based, a polymer-based, and a sulfide-based all-solid-state battery depending on a raw material of the solid electrolyte. The sulfide-based all-solid-state battery has attracted attention due to its superior lithium ion conductivity compared to other types of batteries. In spite of its excellent characteristics of the all-solid-state battery, since the all-solid-state battery has higher ion conductivity and electric resistance between a positive electrode and a negative electrode than a liquid battery, the all-solid-state battery has disadvantages in that it has lower lifespan and output than a battery using a conventional liquid electrolyte.

As a method of manufacturing a positive electrode and a negative electrode of a lithium ion battery, a mixture slurry with low fluidity was prepared by mixing fine solid particles with a solvent, and then coated on a metal current collector as a thin film, dried and compressed. At this time, the slurry is formed by mixing an active material, a conducting agent, and a binder with a solvent in a predetermined ratio. When an electrode of an all-solid-state battery is manufactured in the above manner, it is very difficult to form an interface between the active material and a solid electrolyte compared to a liquid electrolyte since the solid electrolyte is required to be mixed together in the slurry preparation step, and the electric resistance increases significantly as the binder interferes with the formation of the interface. Even when a solid electrolyte having a high ion conductivity is used for preparing the slurry, there is a problem of poor mechanical and chemical conductivity because the crystallized solid electrolyte powder is pulverized into fine particles or mixed with a solvent.

Figure 1:
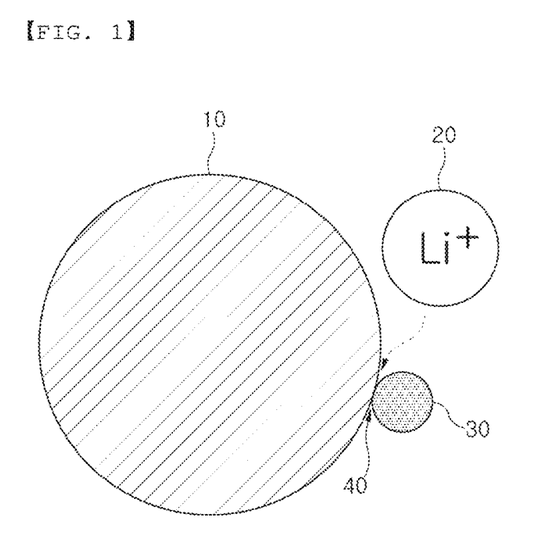
FIG. 1 is a schematic view showing a state in which a triple point is formed in an electrode of an all-solid-state battery.

FIG. 1 shows a state in which a triple point is formed in an electrode of an all-solid-state battery. Referring to FIG. 1, a point on which an electrode active material 10, a conducting agent 30, and a solid electrolyte 20 including lithium ions are commonly abut is formed, and this point is referred to as a triple point 40. Since the triple point is a point at which an electrochemical reaction occurs in an electrode, it is preferable to occur many electrochemical reactions by forming many triple points in the electrode.

A compression molding method has been used as a manufacturing method of the all-solid secondary battery. For example, the compression molding method includes sequentially adding and pressing component powders of a battery in a cylindrical mold, and combining current collectors on a positive electrode and a negative electrode. However, the compression molding method has a problem in that since it is difficult to uniformly deposit a positive electrode layer on an electrolyte layer, uniform current distribution in the positive electrode is not formed, such that deviation of current density may be caused, which may deteriorate performance of the battery.

In addition, when the electrode active material, the solid electrolyte, the conducting agent and a binder are simultaneously mixed, the electrode active material may be isolated by the conducting agent within the electrode structure (dead electrode active material) or the solid electrolyte may be isolated by the electrode active material within the electrode structure (dead solid electrolyte), thereby not only wasting the electrode active material and the solid electrolyte unnecessarily, but also having a problem of lowering the energy density because a pathway of lithium ions is blocked.

Figure 2:
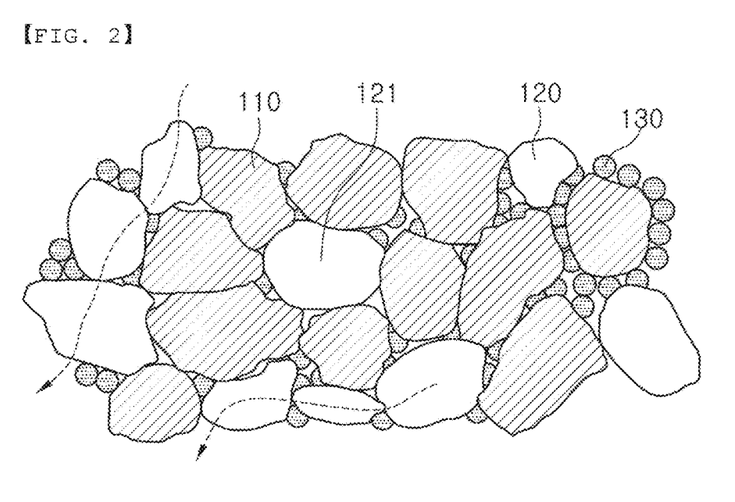
FIG. 2 is a schematic view showing a pathway of lithium ions in an electrode of a conventional all-solid-state battery.

In this regard, FIG. 2 is a schematic view showing a pathway of lithium ions in an electrode of a conventional all-solid-state battery. The electrode of FIG. 2 is manufactured by a method of simultaneously mixing an electrode active material 110, solid electrolytes 120 and 121, and a conducting agent 130. The solid electrolyte 121 located in the center becomes isolated by the active material, and thus cannot be used as a pathway of migrating lithium ions (indicated by a dotted line). As described above, the isolated solid electrolyte 121 that is not able to participate in forming a triple point corresponds to an unnecessary solid electrolyte. Therefore, it is necessary to reduce such unnecessary solid electrolyte and increase the content of solid electrolyte actually participating in electrochemical reactions.

In Patent Document 1, lithium sulfide, which is a positive electrode active material subjected to a wet type mechanical crushing treatment and then followed by drying treatment, is used for a positive electrode for an all-solid-state lithium secondary battery. In order to reduce a particle diameter of the lithium sulfide and increase a contact area with a conducting agent or a solid electrolyte, a dry type mechanical crushing treatment is performed when the dried lithium sulfide is mixed with the conducting agent and the solid electrolyte.

However, the lithium sulfide formed through the dry type mechanical crushing treatment has a disadvantage in that the contact surface with the conducting agent and the solid electrolyte is formed non-uniformly, thereby reducing the efficiency and density of the battery.

Patent Document 2 discloses that after preparing a conducting agent-solid electrolyte nanocomposite in which a solid electrolyte is uniformly dispersed in a mesoporous conducting agent, the conducting agent-solid electrolyte nanocomposite is coated on a surface of lithium compound particles for use as a positive electrode of all-solid-state lithium secondary battery.

The lithium compound coated with the conducting agent-solid electrolyte nanocomposite formed as described above secures an ion-electron migration passage by having the solid electrolyte uniformly distributed in pores of the mesoporous conducting agent and secures the ion-electron migration passage by surrounding an electrode active material made of the lithium compound with the mesoporous conducting agent and a compound of the solid electrolyte. In addition, by using the lithium compound as the active material, a stable structure is maintained even in volume expansion. However, in the case of the mesoporous conducting agent, the pores may be formed non-uniformly, and the solid electrolyte in the non-uniform pores may also be non-uniformly distributed. Therefore, there is a risk of deteriorating the performance of the battery.

As described above, attempts have been made to increase the capacity of a battery, such as adding an additional material or changing a manufacturing method when manufacturing an electrode in an all-solid-state battery. However, a solution that can improve the performance of the battery while being economical has not been proposed.

(Patent Document 1) Japanese Patent Application Publication No. 2013-222501 (2013.10.28)

(Patent Document 2) Korean Registered Patent Publication No. 1673724 (2016.11.01)

Disclosure

Technical Problem

The present invention has been made in view of the above problems, and it is an object of the present invention to provide a novel method of manufacturing by dividing and performing a method of mixing a sulfide-based solid electrolyte, a positive electrode active material, and a conducting agent in each step, thereby increasing ion conductivity of an all-solid-state battery and reducing electric resistance between an electrode and a solid electrolyte.

Technical Solution

In order to accomplish the above object, the present invention provides a method of manufacturing a positive electrode for sulfide-based all-solid-state batteries, the method including: preparing a slurry, wherein the slurry is prepared by a method including the steps of a) mixing a positive electrode active material and a solid electrolyte in a dry state; b) adding a conducting agent to the mixture of step a) and mixing in a dry state; and c) adding a binder and a solvent to the mixture of step b) and mixing in a wet state, coating the slurry on a current collector, and then drying.

Further, a step of adding an additional solid electrolyte and mixing in a dry state may be added between step b) and step c).

Further, a particle size of the solid electrolyte may be different in each mixing step.

Further, an amount of the solid electrolyte may be controlled in step a) so that the solid electrolyte is coated in less than 100% of a surface area of the positive electrode active material in a single layer.

Further, after step c), the method may include d) adding a liquid in which an additional conducting agent and an additional binder are pre-dispersed to the wet mixture of step c) and mixing in a wet state.

Further, after step d), the method may include e) adding another additional binder to the wet mixture of step d) and mixing in a wet state.

Further, the conducting agent of step b) may be 10 to 50% of the total amount of conducting agent used in manufacturing a positive electrode, and the conducting agent of step d) may be 50 to 90% of the total amount of conducting agent used in manufacturing a positive electrode.

Further, a weight ratio of the total positive electrode active material, the total solid electrolyte, the total conducting agent, and the total binder used in a positive electrode for sulfide-based all-solid-state batteries may be 50 to 80:10 to 30:1 to 20:1 to 20.

Further, the positive electrode active material is a sulfur-carbon composite including a porous carbon material, a compound having electrolyte impregnation properties, and sulfur. The positive electrode active material may be a sulfur-carbon composite including a coating layer in which at least one of inner and outer surfaces of the porous carbon material includes the compound having electrolyte impregnation properties.

Further, there may be provided a positive electrode for sulfide-based all-solid-state batteries manufactured by the method of manufacturing a positive electrode for sulfide-based all-solid-state batteries as described above.

Further, the positive electrode for sulfide-based all-solid-state batteries may have an electric resistance (surface resistance) of 400 mΩ/sq or less, and an ion conductivity of $2 \times 10^{-3}$ or more to $7 \times 10^{-5}$ (S/cm) or less.

In addition, the present invention may provide an all-solid-state battery comprising the positive electrode for all-solid-state batteries.

The present invention may also provide a possible combination of the above technical solutions.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

It should be understood that the electrical resistance referred to throughout this specification clearly refers to the surface resistance, unless specifically stated otherwise.

Hereinafter, the present invention will be described in more detail.

The present invention provides a method of manufacturing a positive electrode for sulfide-based all-solid-state batteries, the method comprising:

preparing a slurry, wherein the slurry is prepared by a method comprising a) mixing a positive electrode active material and a solid electrolyte in a dry state;

b) adding a conducting agent to the mixture of step a) and mixing in a dry state; and c) adding a binder and a solvent to the mixture of step b) and mixing in a wet state, coating the slurry on a current collector, and then drying.

Further, a step of adding an additional solid electrolyte and mixing in a dry state may be added between step b) and step c).

In addition, the method may further include d) adding a liquid in which an additional conducting agent and an additional binder are pre-dispersed to the wet mixture of step c) and mixing in a wet state.

In addition, the method may further include e) adding another additional binder to the wet mixture of step d) and mixing in a wet state.

In addition, step c) and step e) may be integrated.

In addition, it is preferable to remove the solvent after the wet mixing step.

The dry state refers to a state in which no solvent is added. The dry state may be 23° C., and the humidity may be a dew point of −50° C., and the higher the temperature and the lower the humidity, the better.

The mixing method is not particularly limited in the present invention, and any well-known method may be used. It may be achieved through a conventional mechano-chemical reaction. In addition, a conventional stirrer, mixer, planetary ball mill, or mortar mixer may be used for mixing. When using a planetary ball mill, the conditions of 50 to 500 rotations/minute, 0.1 to 10 hours, and 1 to 100 kWH/1 kg positive electrode active material may be provided.

The moisture content of each particle is not restricted as long as it is in a dry state, but each particle is desirably dried at 120° C. for 6 hours.

The wet state refers to a state in which a solvent is added. The wet state may be 23° C., and the humidity may be a dew point of −50° C., and the higher the temperature and the lower the humidity, the better. The solvent is not restricted as long as it is anhydrous, but toluene and the like are preferred.

The mixing method is not particularly restricted, but a conventional stirrer, mixer, planetary ball mill, or mortar mixer may be used. When using a planetary ball mill, the conditions of 50 to 500 rotations/minute, 0.1 to 10 hours, and 1 to 100 kWH/1 kg positive electrode active material may be provided.

In step b), the conducting agent may be 10 to 50% based on the total conducting agent used when manufacturing the positive electrode, and in step d), the conducting agent may be 50 to 90% based on the total conducting agent used when manufacturing the positive electrode. In the case in which the conducting agent is not divided and mixed, as can be seen in Table 2 and FIGS. 4 to 8, the conducting agent may be aggregated internally and the ion conductivity and electric resistance (surface resistance) of the solid electrolyte may be deteriorated due to too many conducting agents.

The weight ratio of the total positive electrode active material, the total solid electrolyte, the total conducting agent, and the total binder used in a positive electrode for sulfide-based all-solid-state batteries is 50 to 80:10 to 30:1 to 20:1 to 20. Preferably, it may be 60 to 70:20 to 30:1 to 10:1 to 10.

The positive electrode manufactured according to the method described above may have an electric resistance (surface resistance) of 400 mΩ/sq or less, and an ion conductivity of $2\times10^{-3}$ or more and $7\times10^{-5}$ (S/cm) or less. Preferably, the electric resistance (surface resistance) may be 200 mΩ/sq or less, and the ion conductivity may be $2\times10^{-4}$ or more and $7\times10^{-5}$ (S/cm) or less. More preferably, the electric resistance (surface resistance) may be 100 mΩ/sq or less, and the ion conductivity may be $3\times10^{-4}$ or more and $7\times10^{-5}$ (S/cm) or less.

Positive Electrode Active Material

The positive electrode active material according to the present invention is a sulfur-carbon composite positive electrode active material including a porous carbon material; compound having electrolyte impregnation properties; and sulfur. The positive electrode active material may be a sulfur-carbon composite including a coating layer in which at least one of inner and outer surfaces of the porous carbon material includes the compound having electrolyte impregnation properties.

In addition to the positive electrode active material particle, the positive electrode active material may include, for example, any one among a layered compound such as a lithium nickel oxide ($LiNiO_2$) or a compound substituted with one or more transition metals; a lithium manganese oxide represented by the chemical formula $Li_{1+x}Mn_{2-x}O_4$ (where x is 0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiV_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ in which a portion of Li in the chemical formula is replaced by alkaline earth metal ions; a disulfide compound; Fez $(MoO_4)_3$; and NCM622, or a mixture thereof. In addition, the positive electrode active material includes known materials.

In addition, the average particle diameter of the positive electrode active material is not restricted in the present invention. However, the average particle diameter of the positive electrode active material may be 1 nm to 30 μm.

Sulfide-Based Solid Electrolyte

The solid electrolyte according to the present invention includes a sulfide-based particle as a sulfide-based solid electrolyte. The surface of the sulfide-based particle may be coated or reformed. The sulfide-based solid electrolyte is manufactured using a mixture including the particle through a dry or wet process.

In the present invention, the sulfide-based particle is not particularly restricted. All well-known sulfide-based materials used in the lithium battery field are available. Any sulfide-based materials available on the market may be purchased and used, or a material manufactured by crystallizing an amorphous sulfide-based material may also be used.

Typically, $Li_6PS_5Cl$ (LPSCl), Thio-LISICON ($Li_{3.25}Ge_{0.25}P_{0.75}S_4$), $Li_2S$—$P_2S_5$—LiCl, $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_2P_3S_{11}$, LiI—$Li_2S$—$B_2S_3$, $Li_3PO_4$—$Li_2S$—$Si_2S$, $Li_3PO_4$—$Li_2S$—$SiS_2$, $LiPO_4$—$Li_2S$—SiS, $Li_{10}GeP_2S_{12}$, $Li_{9.54}Si_{1.74}P_{1.44}S_{11.7}Cl_{0.3}$, or $Li_2P_3S_{11}$, may be included.

The particle size of the solid electrolyte in each mixing step may be different. When the particle size of the solid electrolyte is different, the contact area with the surface of the positive electrode active material is widened, thereby improving ion conductivity and electrical resistance. Also, when the solid electrolyte is added again after the conducting agent is added, the possibility of filling empty spaces between the conducting agent, the solid electrolyte, and the positive electrode active material is provided.

In addition, in step a), the amount of the solid electrolyte may be controlled so that the surface area of the positive electrode active material may be coated in an amount of less than 100% in a single layer. The less than 100% means that there is a space in which the solid electrolyte, the positive electrode active material and the conducting agent are in contact with each other by adding the conducting agent between the solid electrolyte and the positive electrode active material, the solid electrolyte being in contact with the positive electrode active material. As can be seen in Table 2 and FIGS. 6 to 8, adding less than 100% to 0% or more of the conducting agent is effective for electric resistance and ion conductivity.

Conducting Agent

The conducting agent according to the present invention is a carbon-based material, and the conducting agent is not particularly restricted as long as the conducting agent exhibits its conductivity while the conducting agent does not induce any chemical change in a battery to which the conducting agent is applied. For example, the conducting agent may include any one or one or more selected from the group consisting of graphite, such as natural graphite or artificial graphite; carbon black, such as carbon black, acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or a conductive material, such as a polyphenylene derivative.

The binder according to the present invention is not particularly limited in the present invention, and a known method may be used. The binder may be one selected from the group consisting of N,N-bis [3-(triethoxysilyl) propyl] urea, polyethylene oxide (PEO), poly(vinylidene fluoride) (PVDF), poly(vinylidene fluoride-co-hexafluoropropylene) (PVDF-co-HFP), conjugated diene rubber latex such as acrylonitrile-based styrene butadiene rubber (SBR), acrylonitrile butadiene rubber (NBR), methyl methacrylate butadiene rubber (MBR), butadiene rubber (BR), carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated EPDM, styrene-butadiene rubber, fluorine rubber, and various copolymers, or a mixture of two or more thereof.

Solvent

It is preferable that the solvent according to the present invention is liquid at a temperature at the time of treatment, and is inert with respect to a sulfide-based electrolyte. For example, the solvent may include one selected from the group consisting of toluene, xylene, naphtha, benzene, chlorobenzene, normal methylpyrrolidone, acetonitrile, acrylonitrile, tetrahydrofuran, cyclopentyl methyl ether, triethylamine, and tributylamine, and a mixed solvent thereof. An aromatic hydrocarbon is more preferred and toluene is more preferred.

The amount of the solvent used may be, for example, in the range of 10 to 100 parts by weight with respect to the positive electrode active material of 100 parts by weight, and preferably in the range of 50 to 80 parts by weight with respect to the positive electrode active material of 100 parts by weight.

Positive Electrode Current Collector

A positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver.

Negative Electrode

A negative electrode current collector is not particularly restricted, as long as the negative electrode current collector exhibits conductivity while the negative electrode current collector does not induce any chemical change in an all-solid-state battery. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may be configured in any of various forms, such as that of a film, a sheet, a foil, a net, a porous body, a foam body, or a non-woven fabric body, on the surface of which a microscale uneven pattern is formed.

A negative electrode active material may be selected from the group consisting of a lithium metal, a lithium alloy, a lithium-metal composite oxide, a titanium composite oxide containing lithium (LTO), and combinations thereof. An alloy of lithium and at least one metal selected from among Na, K, Rb, Cs, Fr, Be, Mg, Ca, Sr, Ba, Ra, In, Al, and Sn may be used as the lithium alloy. In addition, the lithium-metal composite oxide may include lithium and an oxide (MeOx) of a metal (Me) selected from the group consisting of Si, Sn, Zn, Mg, Cd, Ce, Ni, and Fe. For example, the lithium-metal composite oxide may be $Li_xFe_2O_3$ ($0<x\le1$) or $Li_xWO_2$ ($0<x\le1$).

In addition, a metal composite oxide, such as $Sn_xMe_{1-x}Me'_yO_z$ (Me: Mn, Fe, Pb, Ge; Me': Al, B, P, Si, Group 1, 2 and 3 elements of the periodic table, halogen; $0<x\le1$; $1\le y\le3$; $1\le z\le8$), or a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$, may be used as the negative electrode active material. Furthermore, carbon-based negative electrode active materials, such as crystalline carbon, amorphous carbon, and a carbon composite, may be used, either alone or in a combination of two or more components.

In addition, natural graphite, MCMB (meso carbon micro beads) artificial graphite, MCF (meso carbon fiber) artificial graphite, meso phase-based low-temperature sintered carbon, a non-graphitized carbon material or a nanotube may be used as the negative electrode active material, either alone or in a combination of two or more components.

Manufacture of all-Solid-State Battery

Specifically, an all-solid-state battery according to the present invention includes the above-described positive electrode, the above-described negative electrode, and a sulfide-based solid electrolyte interposed between the positive electrode and the negative electrode.

The electrode of the all-solid-state battery has a structure in which an electrode active material is formed on an electrode current collector. The electrode current collector may be omitted depending on the structure of the electrode. In the case in which the electrode is a positive electrode, the electrode current collector is a positive electrode current collector. In the case in which the electrode is a negative electrode, the electrode current collector is a negative electrode current collector.

The all-solid-state battery is manufactured through a dry compression process, in which electrode powder and solid electrolyte powder are manufactured, introduced into a predetermined mold, and pressed. In the present invention, the method of manufacturing the all-solid-state battery excluding a coated slurry composition prepared the above-described method is not particularly restricted. Any well-known method may be used.

In the coating process according to the present invention, an electrode slurry may be coated on the current collector using a method of placing the electrode slurry on the current collector and uniformly dispersing the electrode slurry with a doctor blade, a die casting method, a comma coating method, or a screen printing method. Alternatively, the electrode slurry and the current collector may be formed on a separate substrate, and the electrode slurry and the current collector may be joined to each other through pressing or lamination. At this time, the concentration of a slurry solution or the number of coatings may be adjusted in order to adjust the final coating thickness.

The drying process is a process of removing the solvent or moisture from the slurry in order to dry the slurry coated on the metal current collector. The drying process may vary depending on the solvent that is used. For example, the drying process may be performed in a vacuum oven having a temperature of 50° C. to 200° C. For example, drying may be performed using a warm-air drying method, a hot-air drying method, a low-humidity-air drying method, a vacuum drying method, a (far-) infrared drying method, or an electron beam radiation method. The drying time is not particularly restricted. In general, drying is performed within a range of 30 seconds to 24 hours.

After the drying process, a cooling process may be further performed. In the cooling process, slow cooling to room temperature may be performed such that the recrystallized structure of the binder is sufficiently formed.

In addition, if necessary, a rolling process, in which the electrode is passed through a gap between two heated rolls such that the electrode is compressed so as to have a desired thickness, may be performed in order to increase the capacity density of the electrode and to improve adhesion between the current collector and the active material after the drying process. In the present invention, the rolling process is not particularly restricted. A well-known rolling process, such as pressing, may be performed. For example, the electrode may pass through a gap between rotating rolls, or a flat press machine may be used to press the electrode.

The present invention also provides a battery pack including a battery cell as a unit cell and a device including a battery pack as a power source. Specifically, the battery pack may be used as a power source for a device requiring the ability to withstand high temperatures, a long lifespan, high rate characteristics, etc. Preferable examples of the device may include a mobile electronic device, a wearable electronic device, a power tool driven by a battery-powered motor, an electric vehicle (EV), a hybrid electric vehicle (HEV), a plug-in hybrid electric vehicle (PHEV), or an energy storage system. However, the present invention is not limited thereto.

The structure and manufacturing method of the device are well known in the art to which the present invention pertains, and a detailed description thereof will be omitted.

Hereinafter, the present invention will be described with reference to preferred manufacturing examples and examples with the accompanying drawings. However, the following manufacturing examples and examples are provided only for illustration of the present invention and should not be construed as limiting the scope of the present invention.

Figure 3:
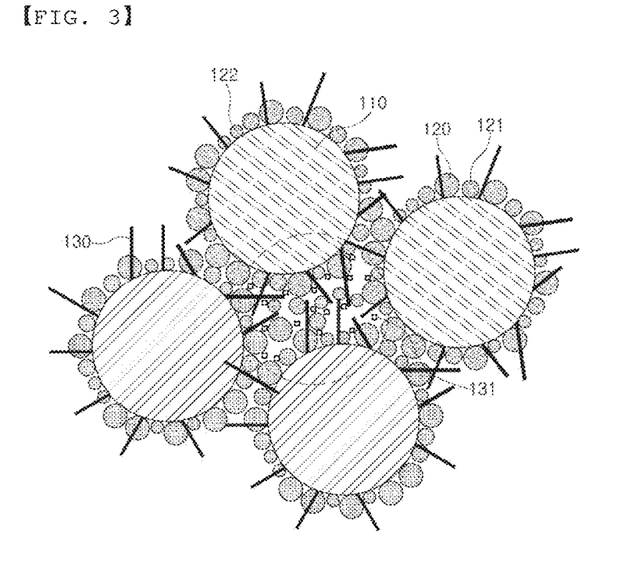
FIG. 3 is a schematic view of an electrode structure by a mixing process of a conventional sulfide-based all-solid-state battery.

FIG. 3 is a schematic view of an electrode structure mixed by a general mixing process. The general mixing process refers to a method of mixing an active material and a portion of solid electrolyte through a dry mixing process, then mixing the remaining solid electrolyte in the mixture, and subsequently, mixing a binder and a conducting agent in this order through a wet mixing process.

A large circle in the center of FIG. 3 means an active material, a small circle around the active material means a solid electrolyte, and a bar shape means a conducting agent.

Figure 4:
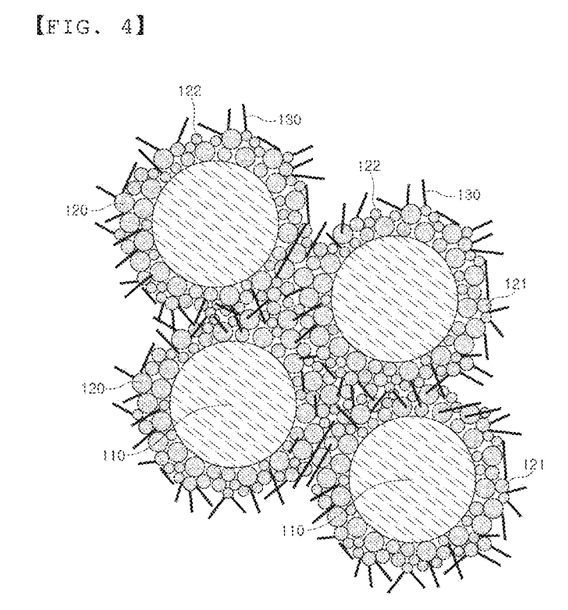
FIG. 4 is a schematic view of an electrode structure by a mixing process according to the present application.

FIG. 4 is a schematic view of an electrode structure mixed according to the present invention. The mixing method means performing the following steps: a) mixing an active material (100%) and 10 to 60% of a solid electrolyte by a dry mixing method and then mixing 10 to 50% of a conducting agent by the dry mixing method; b) mixing the remaining solid electrolyte by the dry mixing method; c) mixing 50% of a binder by a wet mixing method; d) mixing the remaining conducting agent and 20% of binder pre-dispersion solution by the wet mixing method; and e) mixing the remaining binder by the wet mixing method.

The components of FIG. 4 are the same as in FIG. 3 above.

EXAMPLE

In the following example and comparative examples, a positive electrode slurry was mixed by the following method, then coated on a metal current collector, dried and rolled to prepare a positive electrode. A monocell was manufactured using the positive electrode.

Each of the example and the comparative examples was performed in a dry room condition (23° C., dew point of −50° C.). In each of the example and comparative examples, mixing was performed using a paste mixer for 3 to 18 minutes, respectively. In addition, the proportion of the materials used in the example and the comparative examples is based on the total amount of each material used for mixing. The weights of the total positive electrode active material, the total solid electrolyte, and the total conducting agent are 3 g, 1 g, and 0.05 g, respectively.

a) Mixing lithium cobalt manganese oxide (NCM) (100%) as an active material and LPS-based electrolyte (X %) as a solid electrolyte in a dry state
b) Mixing VGCF conducting agent (Y %) as a conducting agent with the material of a) in a dry state
c) Mixing LPS-based electrolyte (100−X %) as a solid electrolyte with the material of b) in a dry state
d) Mixing styrene butadiene rubber (SBR) (50%) as a binder with the material of c) in a wet state
e) Mixing VGCF conducting agent (100−Y %) as a conducting agent and styrene butadiene rubber (SBR) (20%) pre-dispersion solution as a binder with the material of d) in a wet state
f) Mixing styrene butadiene rubber (SBR) (30%) as a binder with the material of e) in the wet state In the above experiment, the size of the active material and the solid electrolyte is a ratio that covers the surface of the active material to less than 100% when the solid electrolyte is added at X %, and the size is not limited. However, in this experiment, based on X=30%, the lithium cobalt manganese oxide (NCM) as an active material was used in a size of 10 μm to 15 μm, and a smaller material than the active material was used for the LPS-based electrolyte as a solid electrolyte. Also, the smaller the size of the conducting agent, the better, but in this experiment, a material of 0.3 μm was used.

In this experiment, the particle state was observed through scanning electronic microscope (SEM) photographs. Electric resistance (surface resistance) was measured using an MP tester after cutting the positive electrode to a size of 5 cm×5 cm. In addition, the ion conductivity was measured using an impedance analyzer (AC Impedence) at room temperature (25° C.) with an amplitude of 5 mV to 10 mV and a measurement frequency range of 0.1 Hz to 1 MHz.

Example was mixed at a ratio of X=30% and Y=30%.
Comparative Example 1 was mixed at a ratio of X=0% and Y=30%.
Comparative Example 2 was mixed at a ratio of X=100% and Y=30%.
Comparative Example 3 was mixed at a ratio of X=30% and Y=0%.
Comparative Example 4 was mixed at a ratio of X=30% and Y=100%.

Figure 5:
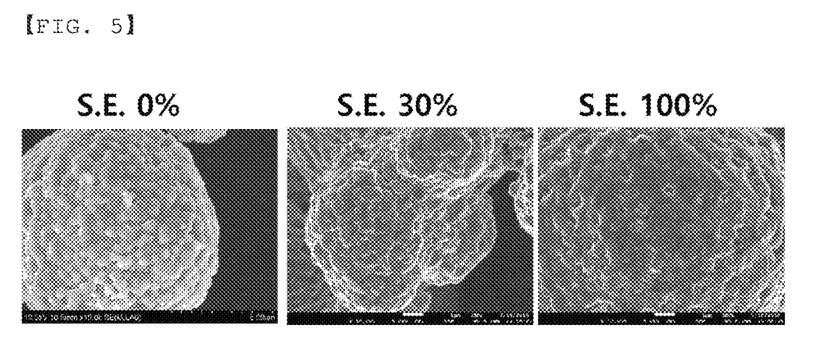
FIG. 5 is comparison pictures of electron microscope of electrodes manufactured by varying an amount of a solid electrolyte according to a method of manufacturing of the present application.
Figure 6:
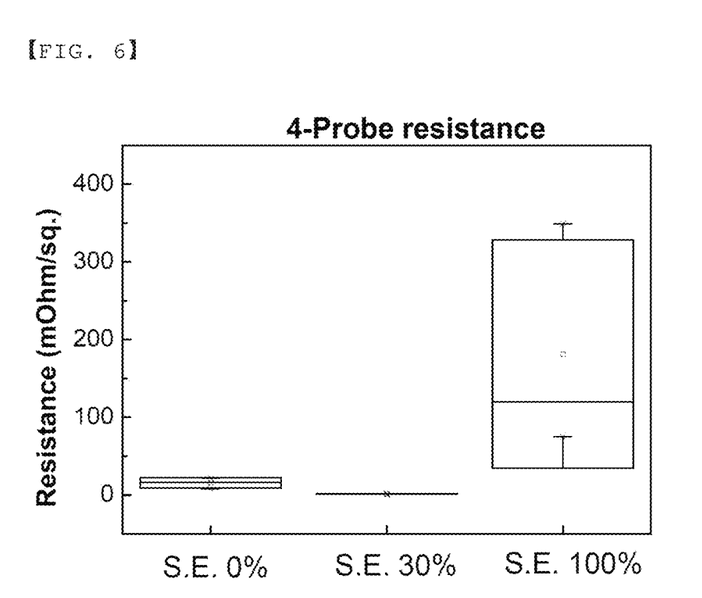
FIG. 6 is a graph comparing electric resistances (surface resistances) of electrodes manufactured by varying an amount of a solid electrolyte according to a method of manufacturing of the present application.
Figure 7:
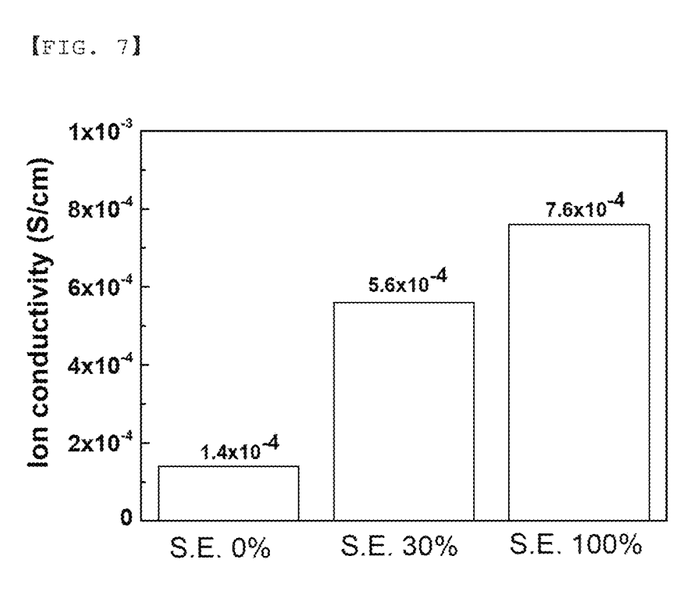
FIG. 7 is a graph comparing ion conductivities of electrodes manufactured by varying an amount of a solid electrolyte according to a method of manufacturing of the present application.

Table 1 and FIGS. 5 to 7 compare Example and Comparative Examples 1 and 2. Table 1 is a table comparing electric resistance (surface resistance) and ionic conductivity, and FIG. 5 is scanning electronic microscope (SEM) photographs in which Example and Comparative Examples were observed.

According to Table 1, it can be seen that Example has significantly lower electric resistance than Comparative Examples 1 and 2. In addition, when compared with a photograph in which the solid electrolyte is 100% in FIG. 5, it can be seen that when 30% of the solid electrolyte is added, it is appropriately surrounded to such an extent that the surface curvature of the active material can be confirmed.

TABLE 1

|  | Comparative Example 1 | Example 1 | Comparative Example 2 |
|---|---|---|---|
| Electric resistance(mΩ/sq) | 15.7 | 1.6 | 181.0 |
| Ion conductivity(S/cm) | $1.4 \times 10^{-4}$ | $5.6 \times 10^{-4}$ | $7.6 \times 10^{-4}$ |

Figure 8:
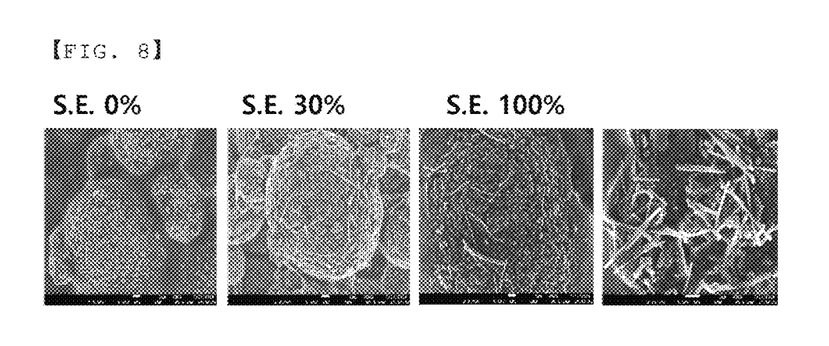
FIG. 8 is comparison pictures of electron microscope of electrodes manufactured by varying an amount of a conducting agent according to a method of manufacturing of the present application.
Figure 9:
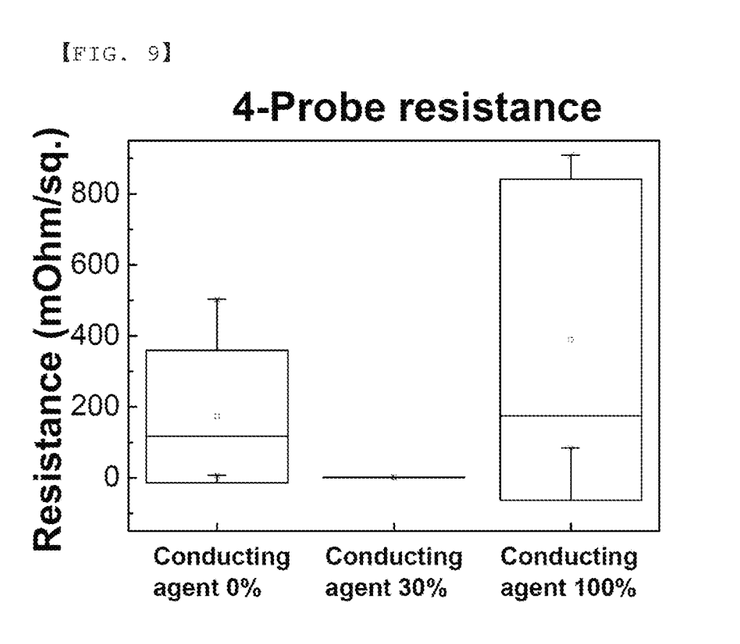
FIG. 9. is a graph comparing electrical resistances (surface resistances) of electrodes manufactured by varying an amount of a conducting agent according to a method of manufacturing of the present application.
Figure 10:
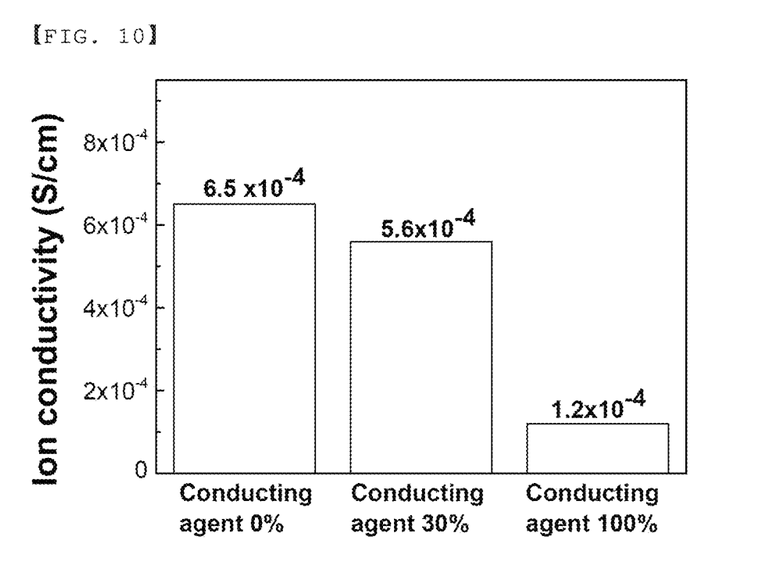
FIG. 10 is a graph comparing ion conductivities of electrodes manufactured varying an amount of a conducting agent according to a method of manufacturing of the present application.

Table 2 and FIGS. 8 to 10 compare Example and Comparative Examples 3 and 4. Table 2 is a table comparing electric resistance (surface resistance) and ionic conductivity, and FIG. 8 is scanning electronic microscope (SEM) photographs in which Example and Comparative Examples were observed. FIG. 9 and FIG. 10 are graphs corresponding to Table 2.

According to Table 2 below, it can be seen that Example has significantly lower electric resistance than Comparative Examples, and Example has excellent ion conductivity compared to Comparative Example 4. In addition, it can be seen that a photograph in which 100% of the conducting agent is added in FIG. 8 shows that the solid electrolyte cannot be filled into. However, it can be seen that when 30% of the conducting agent is added, the conducting agent is interspersed and filled between the active material and the solid electrolyte.

TABLE 2

|  | Comparative Example 3 | Example 1 | Comparative Example 4 |
|---|---|---|---|
| Electric resistance(mΩ/sq) | 172 | 1.6 | 389 |
| Ion conductivity(S/cm) | $6.5 \times 10^{-4}$ | $5.6 \times 10^{-4}$ | $1.2 \times 10^{-4}$ |

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

10, 110: Electrode active materials
20, 120, 121: Solid electrolytes
30, 130, 131: Conducting agents
40: Triple point

INDUSTRIAL APPLICABILITY

The present invention relates to a method of mixing a positive electrode material for sulfide-based all-solid-state batteries, through which a contact between a conducting agent, an active material, and a solid electrolyte is improved, whereby it is possible to provide a sulfide-based all-solid-state battery with higher ion conductivity than a conventional positive electrode and reduced electric resistance (surface resistance) with the solid electrolyte. The sulfide-based all-solid-state battery according to the present invention has advantages of not only exhibiting superior capacity properties than that of a conventional sulfide-based all-solid-state battery, as the ion conductivity is increased and the electric resistance is reduced, but also being excellent in terms of economic aspect, as the manufacturing process is simpler than that of the conventional process.

The invention claimed is:

1. A method of manufacturing a positive electrode for sulfide-based all-solid-state batteries, comprising:
   preparing a slurry, wherein the slurry is prepared by:
   a) mixing a positive electrode active material and a solid electrolyte in a first dry state;
   b) adding a conducting agent to the mixture of the step a) and mixing in a second dry state;
   c) adding a first portion of a binder and a solvent to the mixture of the step b) and mixing in a first wet state, and
   d) adding a liquid in which an additional conducting agent and a second portion of the binder are pre-dispersed to the wet mixture of the step c) and mixing in a second wet state,
   coating the slurry on a current collector, and then drying.

2. The method according to claim 1, further comprising adding an additional solid electrolyte between the steps b) and c) and mixing in a third dry state.

3. The method according to claim 1, wherein a particle size of the solid electrolyte is different in each mixing step.

4. The method according to claim 1, wherein the step a) comprises controlling an amount of the solid electrolyte so that the solid electrolyte is coated in less than 100% of a surface area of the positive electrode active material in a single layer.

5. The method according to claim 1, further comprising step e) below after the step d):
   e) adding a third portion of the binder to the wet mixture of the step d) and mixing in a third wet state.

6. The method according to claim 1, wherein
   the conducting agent of the step b) is 10 to 50% of a total amount of conducting agent used in manufacturing the positive electrode, and
   the conducting agent of the step d) is 50 to 90% of a total amount of conducting agent used in manufacturing the positive electrode.

7. The method according to claim 1, wherein a weight ratio of a total positive electrode active material, a total solid electrolyte, a total conducting agent, and a total binder used in the positive electrode for sulfide-based all-solid-state batteries is 50 to 80:10 to 30:1 to 20:1 to 20.

8. The method according to claim 1, wherein the positive electrode active material is a sulfur-carbon composite electrode active material comprising a porous carbon material, a compound having electrolyte impregnation properties, and sulfur, wherein the sulfur-carbon composite electrode active material includes a coating layer in which at least one of an inner surface or an outer surface of the porous carbon material includes the compound having electrolyte impregnation properties.

9. A positive electrode for sulfide-based all-solid-state batteries manufactured by the method according to claim 1.

10. The positive electrode for sulfide-based all-solid-state batteries according to claim 9, wherein an electric resistance (surface resistance) is 400 mΩ/sq or less, and an ion conductivity is $2 \times 10^{-3}$ or more to $7 \times 10^{-5}$ (S/cm) or less.

11. An all-solid-state battery comprising the positive electrode for sulfide-based all-solid-state batteries according to claim 9.

* * * * *